No. 684,916. Patented Oct. 22, 1901.
E. J. CULLEN.
COMBINATION REIN AND HORSE HOLDER.
(Application filed Jan. 24, 1901.)
(No Model.)
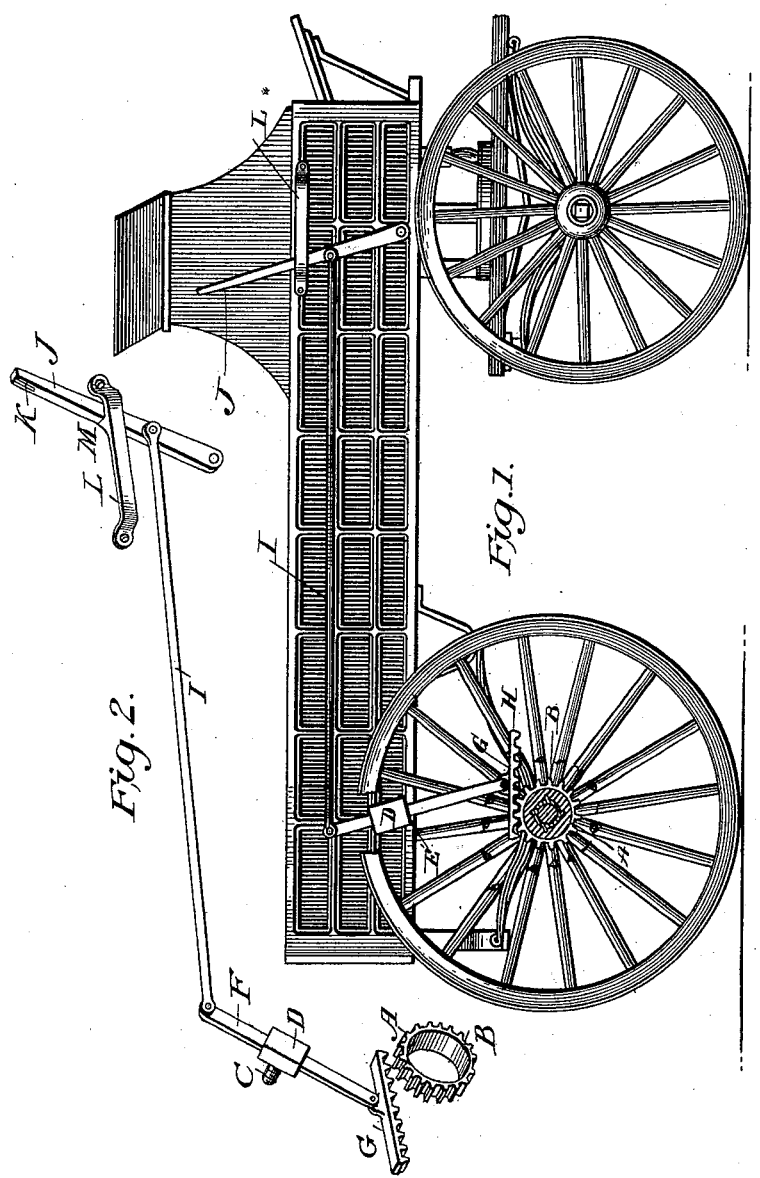

UNITED STATES PATENT OFFICE.

EDWARD JOHN CULLEN, OF CORNING, NEW YORK.

COMBINATION REIN AND HORSE HOLDER.

SPECIFICATION forming part of Letters Patent No. 684,916, dated October 22, 1901.

Application filed January 24, 1901. Serial No. 44,637. (No model.)

*To all whom it may concern:*

Be it known that I, EDWARD JOHN CULLEN, a citizen of the United States of America, residing at Corning, in the county of Steuben and State of New York, have invented certain new and useful Improvements in Combination Rein and Horse Holders, of which the following is a specification.

This invention relates to rein-holders, and more particularly to that class adapted to hold a horse.

The object of this invention is to provide a combination rein and horse holder which may be easily and quickly attached to a vehicle, one that will not only hold the reins, but will control the reins in such a manner as to hold the horse as well.

Another object of this invention is to provide a combination rein and horse holder which is exceedingly cheap and simple in its construction, one that will tighten the reins when the horse moves forward and slacken the same when the horse moves backward.

With these objects in view and such others as may hereinafter appear my invention consists in the particular construction of the various parts and in the novel manner of combination and arrangement of said parts, all of which will be more fully described, and specifically pointed out in the appended claims.

In the drawings forming a part of this specification, Figure 1 is a side elevation of a wagon, illustrating my invention as applied. Fig. 2 is a perspective view showing the invention detached.

Referring by letters to the drawings, A represents a metal band upon the hub of the rear wheel. This band is provided upon its periphery with cog-teeth B, the object of which will be hereinafter explained.

Pivotally mounted on the side of the vehicle is a bolt C, which is provided with an elongated head D, having an aperture E therein adapted to receive the lever F, which is adapted to be raised or lowered through the aperture. The lower end of the lever F is pivoted to a bar G, having cog-teeth H thereon adapted to mesh with the cog-teeth B upon the band A, secured upon the inner end of the hub. The upper end of the lever F is pivoted to one end of the rod I, the other end of which is pivoted to a lever J, mounted upon the side of the wagon-body approximately near the front end. This lever is provided upon its free end with a slot K, in which the reins may be secured and is held in position by the guide L, having a catch M in the forward end thereof for locking the lever, the object of which will be fully explained. When the lever J is in the locked position, the device is out of gear. When unlocked or thrown back, the rod I forces the lever F back, and thereby causes the cogged bar to engage the cogged band, thus setting the device in the operative position.

It will be readily seen that when the vehicle-wheels revolve the cogged band secured to the rear-wheel hub will revolve also and will cause the cogged bar to travel forward. In so doing the bar which is pivoted to the lower end of the lever F will cause the upper end of this lever to move backward, and as the lever F is connected by a rod I to the lever J it will cause the lever J to move backward also, thereby exerting a direct pull upon the reins. It will also be seen that if the horse should move backward the operation of the device would be the reverse and that the reins would be slackened instead of tightened. The reins may be provided with buttons or stops, which will prevent them from being drawn through the slot, or any desired form of a clamp for securing the reins may be employed.

I deem the foregoing explanation sufficiently plain that the invention will be readily readily understood by all conversant in such matters, the extreme simplicity rendering an elaborate description unnecessary.

Having thus described the various features of my invention, what I claim as new, and desire to secure by Letters Patent, is—

1. In a combined rein and horse holder, a bolt mounted in the side of a vehicle, a lever adjusted and fulcrumed upon the said bolt, a cogged bar pivoted to the lower end of the said lever, a cogged band adapted to engage the said cogged bar, a rod connecting the upper end of the said lever to a second lever, a slot in the free end of the second-mentioned lever, and a guide having a catch, substantially as shown and described.

2. In a combined rein and horse holder, a lever adjusted and fulcrumed to the side of a vehicle, a cogged bar pivoted to the lower end of the lever, a cogged band adapted to engage the cogged bar, a rod connecting the upper end of the lever to a second lever, a guide for the second-mentioned lever, a catch in the said guide and a slot in the free end of the second-mentioned lever, substantially as shown and for the purpose set forth.

EDWARD JOHN CULLEN.

Witnesses:
J. L. CLARK,
J. W. NOLAN.